UNITED STATES PATENT OFFICE.

FERDINAND EICHENBERGER, OF AARAU, SWITZERLAND, ASSIGNOR TO THE FIRM S.-A. KUMMLER & MATTER, OF AARAU, SWITZERLAND.

PROCESS OF MANUFACTURING ELECTRICAL RESISTANCE MATERIAL.

1,420,980.  Specification of Letters Patent.  Patented June 27, 1922.

No Drawing.  Application filed November 6, 1920. Serial No. 422,336.

*To all whom it may concern:*

Be it known that I, FERDINAND EICHENBERGER, engineer, a citizen of the Swiss Confederation, residing at Aarau, Switzerland, have invented new and useful Improvements in a Process of Manufacturing Electrical Resistance Material, of which the following is a specification.

The present invention relates to a new and improved process of manufacturing electrical resistance material which stands low, mediate and high temperatures.

The novel process consists in that silicon carbide is used as a base to which calcium carbonate, oxids of metals and graphite are mixed to vary the coefficient of resistance.

These admixed substances serve not only the said purpose but at the same time either singly or in combination as a binder to form said silicon carbide to a solid body which stands not only very frequent and very quick variations of temperature within wide limits but also a continuous heating to high temperatures and which, when in incandescent condition stands the occurring mechanical strains, vibrations, etc. The temperature coefficient of the resistance material made according to the new process is negative. The body may have any shape it may be a rod, a tubular body, a plate or disk, a ring, and so on.

The process of manufacturing a resistance may be carried out for instance in the following manner:

10 parts by weight of silicon carbide, 4 parts by weight of calcium carbonate, 1 part by weight of iron oxide, 4 parts by weight of graphite are finely powdered and thoroughly mixed and a paste is formed which is pressed into molds. The so shaped body is embedded in a sand mixture which is practically non-fusible and is heated in a suitable furnace until the material is converted to a solid body. The sand in which the body is embedded excludes air from the body while the same is being heated, as will be understood. The later is now ready for use.

Having thus described my invention, what I claim as new is:

1. The herein described process of manufacturing an electrical resistance material, consisting in forming a paste of finely comminuted silicon carbide, calcium carbonate, oxides of iron and graphite, forming the same into a body, and solidifying the same by burning it at a high temperature in the absence of air.

2. The herein described process of manufacturing an electrical resistance material, consisting in forming a paste of finely comminuted silicon carbide, calcium carbonate, oxide of metal and graphite, molding the same into a body, embedding said body in a sand mixture, and burning the same at a high temperature in the absence of air.

In witness whereof I affix my signature.

FERDINAND EICHENBERGER, ENG.